US011390206B2

(12) United States Patent
Terpin et al.

(10) Patent No.: US 11,390,206 B2
(45) Date of Patent: Jul. 19, 2022

(54) RECREATIONAL VAN AND MULTI-PURPOSE COMPARTMENT

(71) Applicants: Gregory Alan Terpin, Champion, PA (US); Michael Alan Terpin, Champion, PA (US)

(72) Inventors: Gregory Alan Terpin, Champion, PA (US); Michael Alan Terpin, Champion, PA (US)

( * ) Notice: Subject to any disclaimer, the term of this patent is extended or adjusted under 35 U.S.C. 154(b) by 0 days.

(21) Appl. No.: 16/165,533

(22) Filed: Oct. 19, 2018

(65) Prior Publication Data

US 2019/0118697 A1 Apr. 25, 2019

Related U.S. Application Data

(60) Provisional application No. 62/574,926, filed on Oct. 20, 2017.

(51) Int. Cl.
*B60P 3/39* (2006.01)
(52) U.S. Cl.
CPC ..................... *B60P 3/39* (2013.01)
(58) Field of Classification Search
CPC ...... B60P 3/39; B60P 3/36; B60P 3/32; B60P 3/34; B60P 3/07; B60P 1/02; B60P 3/42; B60P 3/08; B60P 3/341
USPC ...... 296/156, 164, 168, 173, 158, 69, 65.01, 296/64; 49/501, 503, 139, 163, 70, 504
See application file for complete search history.

(56) References Cited

U.S. PATENT DOCUMENTS

| | | | | | |
|---|---|---|---|---|---|
| 3,731,968 | A | * | 5/1973 | Duffield | B60P 3/42 296/10 |
| 4,648,649 | A | * | 3/1987 | Beal | B60P 3/42 296/100.04 |
| D310,806 | S | * | 9/1990 | Hertzberg | D12/403 |
| 5,078,441 | A | * | 1/1992 | Borskey | B60J 7/165 292/DIG. 72 |
| 6,565,143 | B2 | * | 5/2003 | Okamoto | B60P 3/341 296/156 |
| D765,013 | S | * | 8/2016 | Hindelang | D12/401 |
| 9,669,690 | B2 | * | 6/2017 | James | B60P 1/02 |
| D859,285 | S | * | 9/2019 | Terpin | D12/413 |
| 2002/0125736 | A1 | * | 9/2002 | Messano | B60P 3/34 296/165 |

\* cited by examiner

*Primary Examiner* — D Glenn Dayoan
*Assistant Examiner* — Sunsurraye Westbrook
(74) *Attorney, Agent, or Firm* — Goldberg Cohen LLP

(57) ABSTRACT

A recreational vehicle comprising a van body having a roof with an opening, and a multi-purpose compartment engaged with the roof about the opening. The multi-purpose compartment comprises first and second compartments. The first compartment comprises a frame secured to the roof of the van and a shell engaged with the frame. The second compartment comprises a shell and a platform. The second compartment is moveable from a closed position wherein the second compartment is disposed above the roof and an open position where the second compartment is extended from the roof. A mattress or bed or other items may be placed or stored in the second compartment.

14 Claims, 8 Drawing Sheets

RECREATIONAL VAN AND MULTI-PURPOSE COMPARTMENT

CROSS-REFERENCE TO RELATED APPLICATIONS

This application claims the benefit of and priority to U.S. Provisional Application Ser. No. 62/574,926 filed on Oct. 20, 2017, which is hereby incorporated by reference in its entirety.

BACKGROUND OF THE INVENTION

For many years, vehicles have been originally built and/or modified for recreational use. Such vehicles are commonly known as recreational vehicles. Factory made vans and pick-up trucks have been modified for use as recreational vehicles with limited success. There is not a simple way to modify a factory made van for use as a recreational vehicle or to purchase a factory made van that can be used as a recreational vehicle.

SUMMARY OF THE INVENTION

The present invention is a recreational vehicle comprising a van body having a roof with an opening, and a multi-purpose compartment engaged with the roof about the opening. The multi-purpose compartment comprises first and second compartments. The first compartment comprises a frame secured to the roof of the van and a shell engaged with the frame. The second compartment comprises a shell and a platform. The second compartment is moveable from a closed position wherein the second compartment is disposed above the roof and an open position where the second compartment is extended from the roof. A mattress or other items may be placed or stored in the second compartment.

BRIEF DESCRIPTION OF THE DRAWINGS

The following description of the invention will be more fully understood with reference to the accompanying drawings in which.

DESCRIPTION OF THE INVENTION

Figure 1:
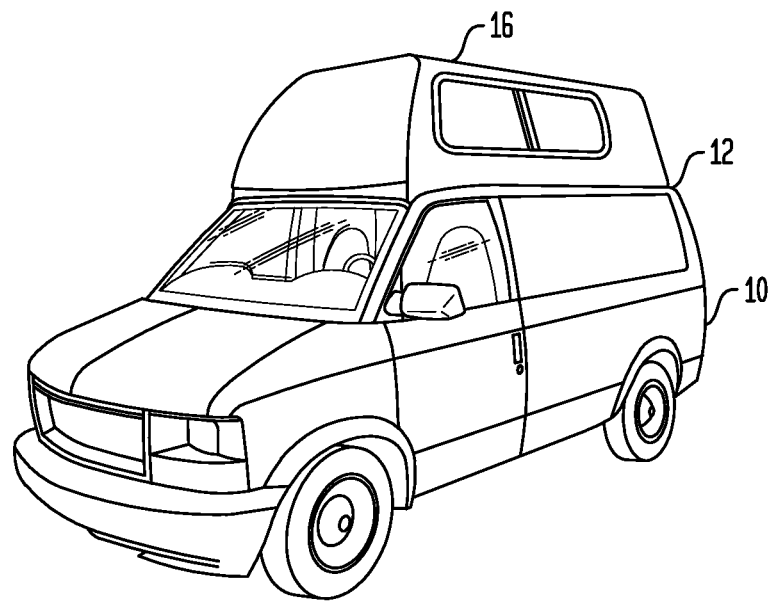
FIG. 1 is a perspective view of the exterior of the van with the sliding multi-purpose compartment in the closed position.
Figure 2:
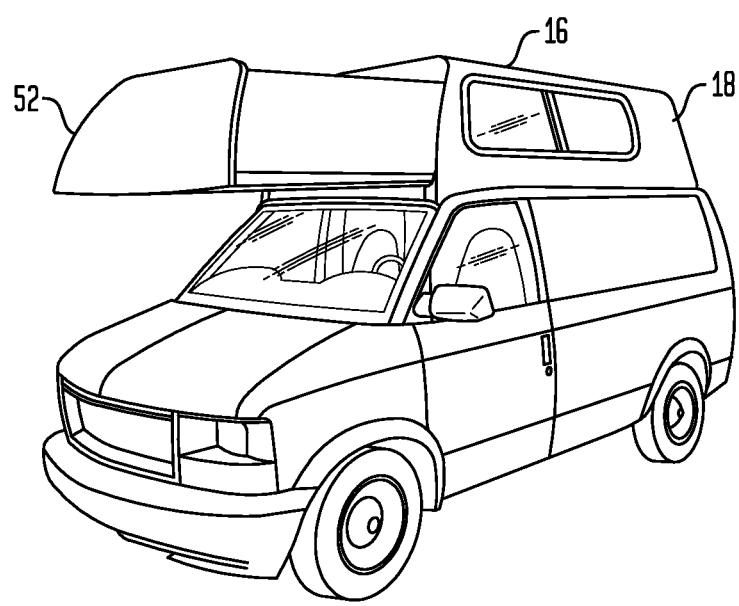
FIG. 2 is a perspective view of the exterior of the van with the sliding multi-purpose compartment in the open position.
Figure 3:
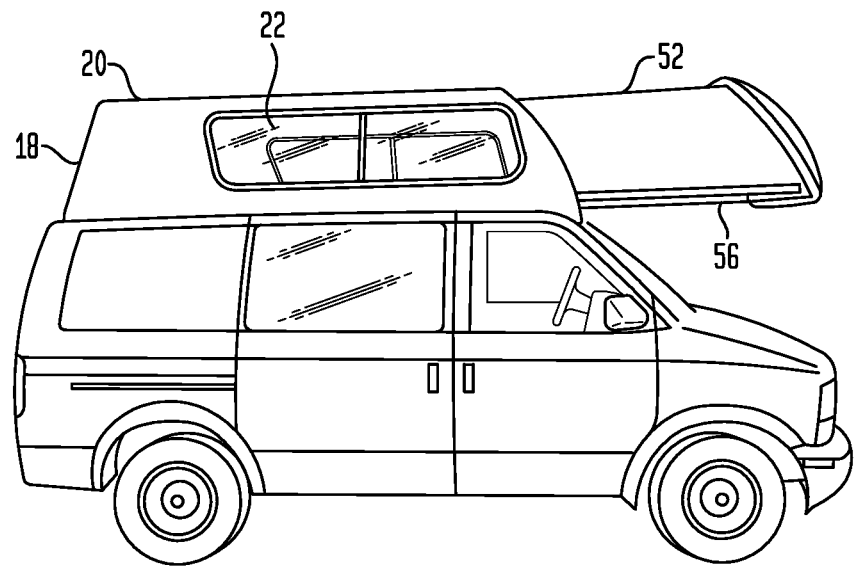
FIG. 3 is a side view of the exterior of the van with the sliding multi-purpose compartment in the open position.

Referring to FIGS. 1-3, the present invention is an overhead sliding multi-purpose compartment (16) for a recreational vehicle such as a van (10) having a roof (12). Multi-purpose compartment (16) generally comprises a first compartment (18) and a second compartment (52) moveably engaged with first compartment (18). First compartment (18) generally comprises an exterior shell (20) that replaces the posterior parts of the van roof (12) to increase the ceiling height. Second compartment (52) can slide forward over the front of the vehicle (10) and may be used to hold a bed such as a cushion or mattress to provide a sleeping area or as space for additional storage or various items. When in the closed position (FIG. 1), the bottom of a platform (56) that supports the bed within second compartment (52) is near the normal height of the van ceiling if it were to not have first compartment (18) on top of it. When in the open position (FIG. 2), the second compartment (52) is extended over the front of the vehicle and the ceiling height is increased to that of first compartment (18), which is full standing height (FIG. 3).

Figure 5:
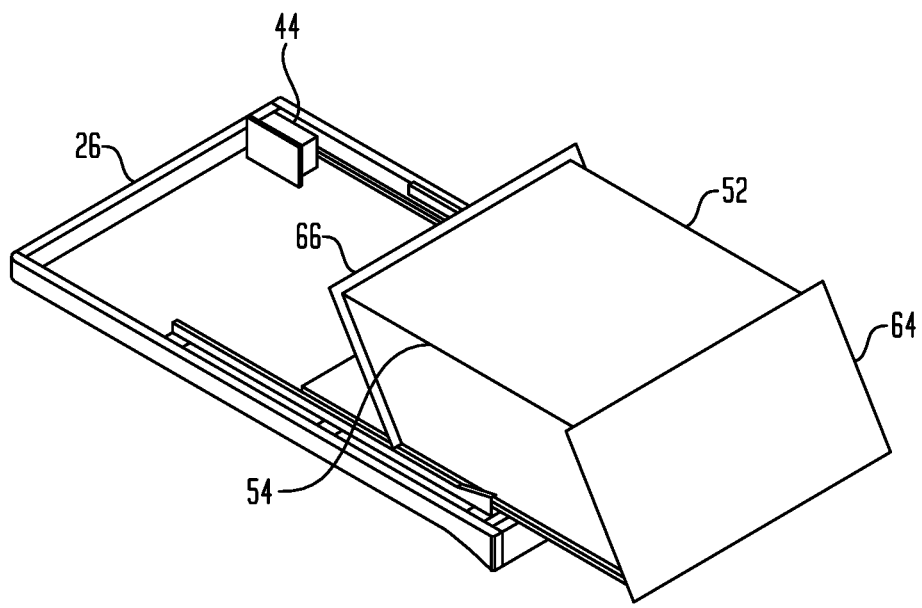
FIG. 5 is an assembly view showing a shell of the second compartment mounted to left and right guide rails that are attached to a frame.
Figure 6:
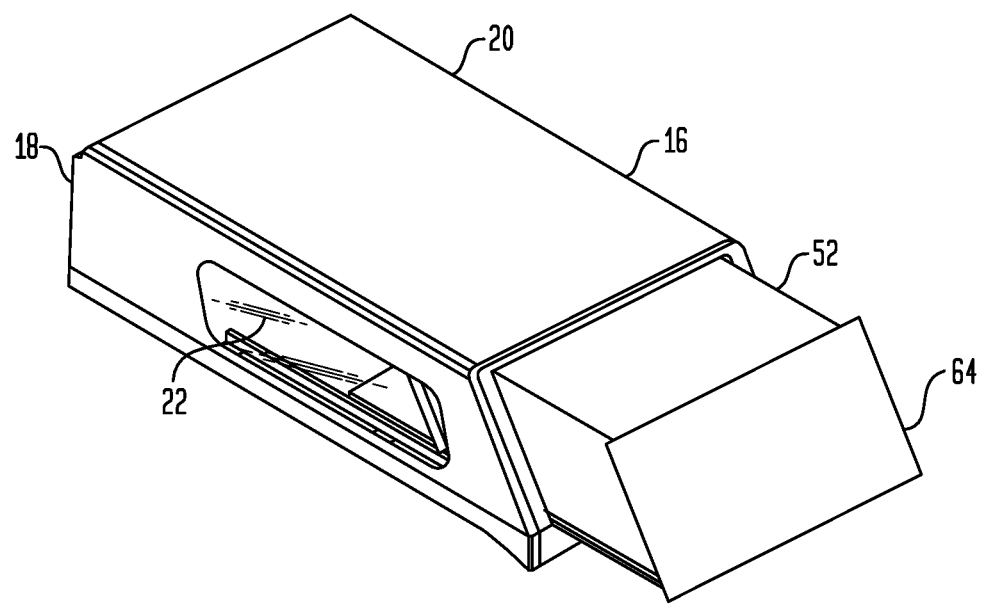
FIG. 6 is an assembly view of the multi-purpose compartment showing a first compartment and a second compartment mounted to left and right guide rails that are attached to a frame.
Figure 7:
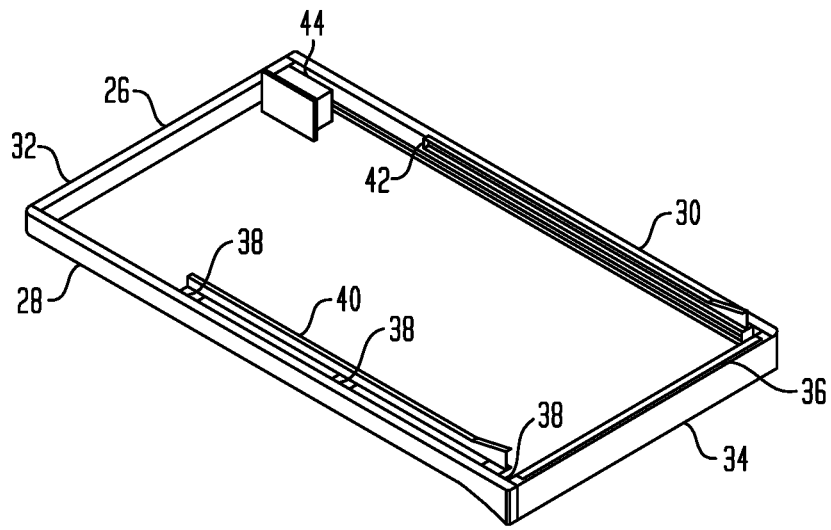
FIG. 7 is an assembly view of the frame, tracks, front guide rail, and an automatic opener.
Figure 8:
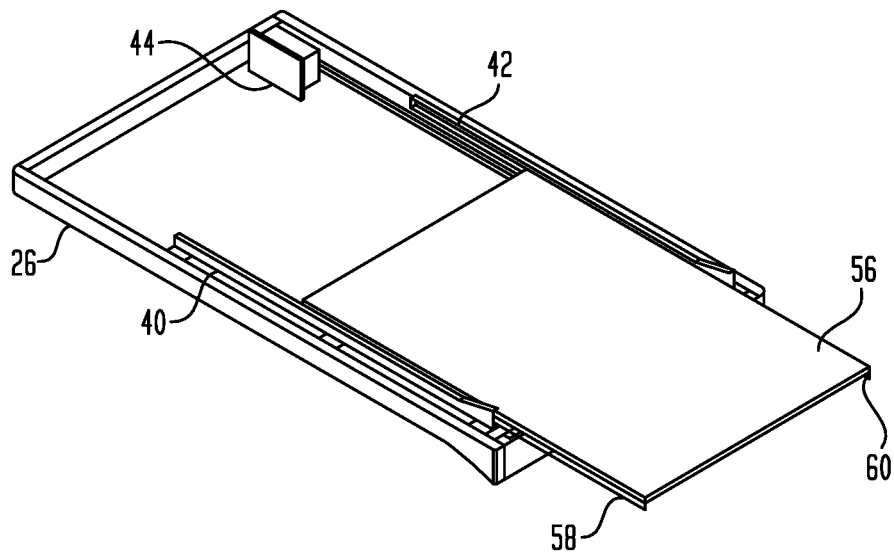
FIG. 8 is an assembly view showing a platform mounted to left and right guide rails.
Figure 9:
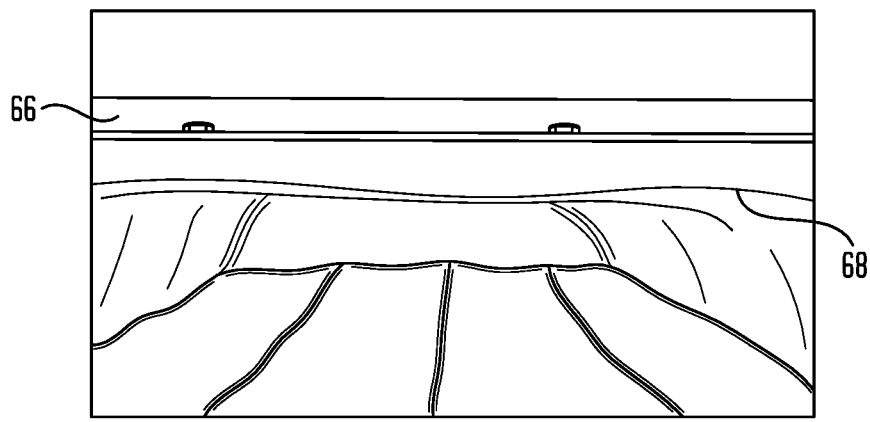
FIG. 9 is a close-up view of a removable seal that closes against the shell when the sliding multi-purpose compartment is in the open position.
Figure 12:
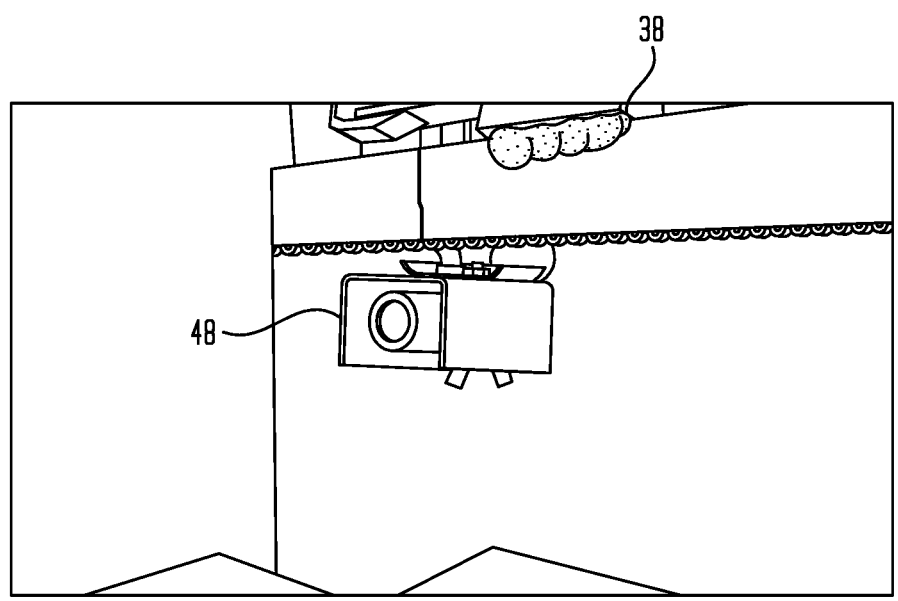
FIG. 12 is a close-up view of the object detection sensor for the automatic opener.

Referring to FIGS. 5-8 and 10, platform 56 of second compartment 52 comprises wheels (62) that follow tracks (40/42) mounted to the sides of a bottom frame (26) that secures first compartment 18. The bottom of platform (56) is attached to an automatic opener (44) so that the second compartment (52) can be extended and retracted remotely (FIG. 8, 10, 11, 14). Automatic opener (44) comprises sensors (48) that can detect if an object is in the path of the traveling second compartment (52) and prevent the second compartment from closing on it (FIG. 12, 14). In both the open and closed positions, the second compartment (52) has a solid seal (66) between the outside of the second compartment shell (54) and the opening in the front of the first compartment (18). The compartment seal (66) at the back of second compartment (56) can be removed to allow second compartment (52) to slide completely forward and be removed from first compartment (18) if necessary (FIG. 5, 9).

Figure 4:
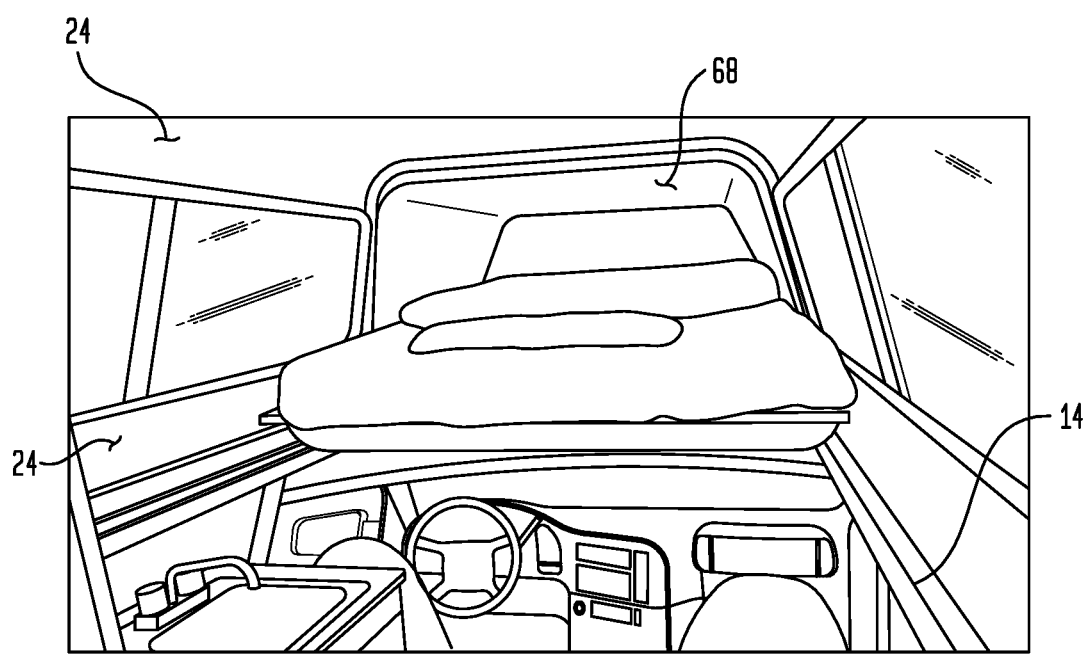
FIG. 4 is a perspective view of the interior of the van showing the multi-purpose compartment with the Second Compartment in the open position.
Figure 10:
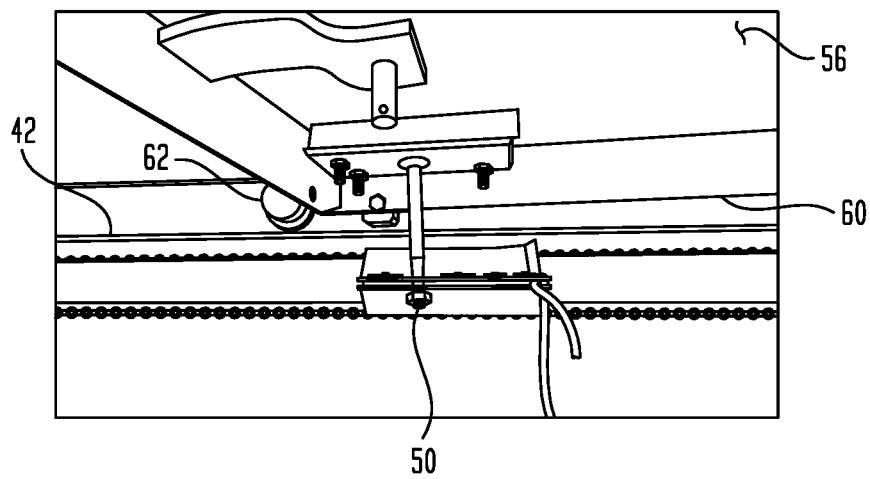
FIG. 10 is a close-up view of the wheel and track attachment and the attachment between the bottom of the sliding multi-purpose compartment and the automatic opener.
Figure 11:
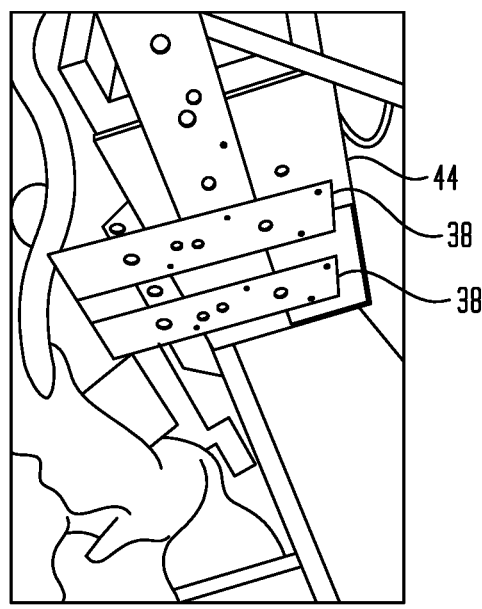
FIG. 11 is a close-up view of the automatic opener at the rear of the vehicle.

The creation of this invention can be achieved by cutting a rectangular opening (14) in the roof (12) of a van (10) from just behind the overhead area of the front seats to the rear of the vehicle (FIG. 1, 4). A wooden frame (26) is then fabricated to fit around the perimeter of the top of the van consisting of a left member (28), right member (30) back member (32), and front member (34) joined together by mechanical fasteners (FIG. 7). Then, a front guide rail (36) is attached to the top of the front member of the frame with mechanical fasteners (FIG. 7). Left track (40) and right track (42) are then welded to L-shaped metal mounting brackets (38) (FIG. 7, 8). These brackets are then attached to the left member and right member of the frame using mechanical fasteners (therefore joining the tracks to the frame). A first compartment shell (20) is then formed with fiberglass and attached to the outside of the frame by both mechanical fasteners and the chemical bond between the hardened fiberglass and the wood (FIG. 3,6). Windows (22) are then installed in the exterior shell using mechanical fasteners (FIG. 3,6). A second compartment shell (54) is then formed with fiberglass so that is a shape and size that it can pass through the inside of the opening in the front of the first compartment shell (20) (FIG. 3, 5, 6). The face-plate (64) of the second compartment shell is fabricated with fiberglass so that it is larger than the opening in the front of the exterior shell and will cover the opening when the second compartment is in a closed position (FIG. 6). The second compartment shell is then attached to the top of the platform (56) by use of mechanical fasteners (FIG. 5,8). The insides of both the first compartment shell and the second compartment shell are then sprayed with closed-cell foam insulation (24 & 68) to add strength and insulation to the fiberglass (FIG. 4). Left platform guide rail (58) and right platform guide rail (60) are then attached to the bottom of the platform with mechanical fasteners (FIG. 7). Platform guide rails (58 & 60) are then aligned with the front guide rail (36) in order to direct the travel of the platform and ultimately the entire second compartment assembly (52) (FIG. 8). Two wheels (62) are then attached to the back corners of the platform with mechanical fasteners and are positioned travel along the tracks that are mounted to the side of the frame (FIG. 10). Then, a compartment seal (66) is fabricated and attached to the inner-end of the second compartment shell using mechanical fasteners, and it closes against the opening of the first compartment shell when the second compartment is in the open position (FIG. 5,9). The automatic opener (44) is then welded to the metal mounting brackets (38) that connect the tracks to the frame (FIG. 10,12). The opener is also attached to the bottom of the platform using the opener attachment (50) and mechanical fasteners (FIG. 10). The multi-purpose compartment assembly (16) is secured to the top of the van by attaching additional metal brackets (38) to the frame with mechanical fasteners and welding the brackets to the remaining portions of the roof of the van.

Figure 13:
FIG. 13 is a perspective view of the interior of the van showing a bathroom when the multi-purpose compartment is in the open position.
Figure 14:
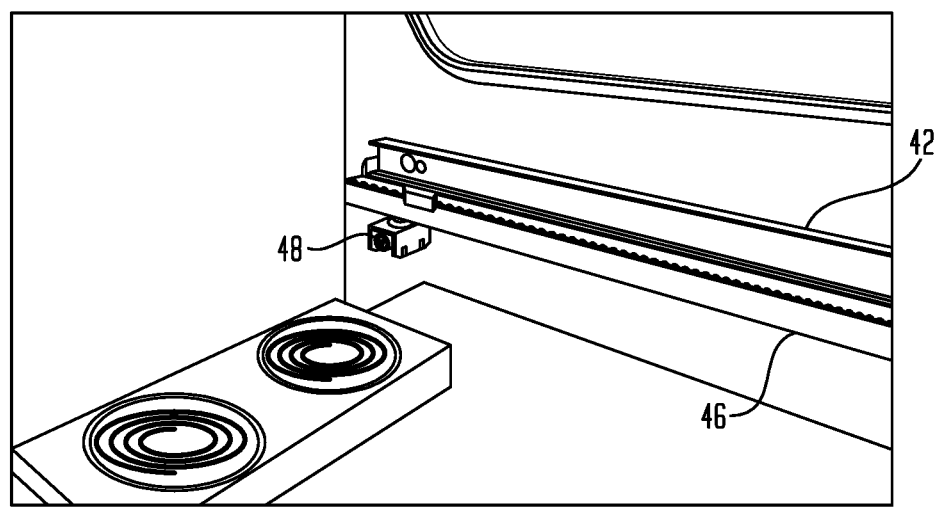
FIG. 14 is a perspective view of the slide track, automatic opener track, and the object detection sensor for the automatic opener.
Figure 15:
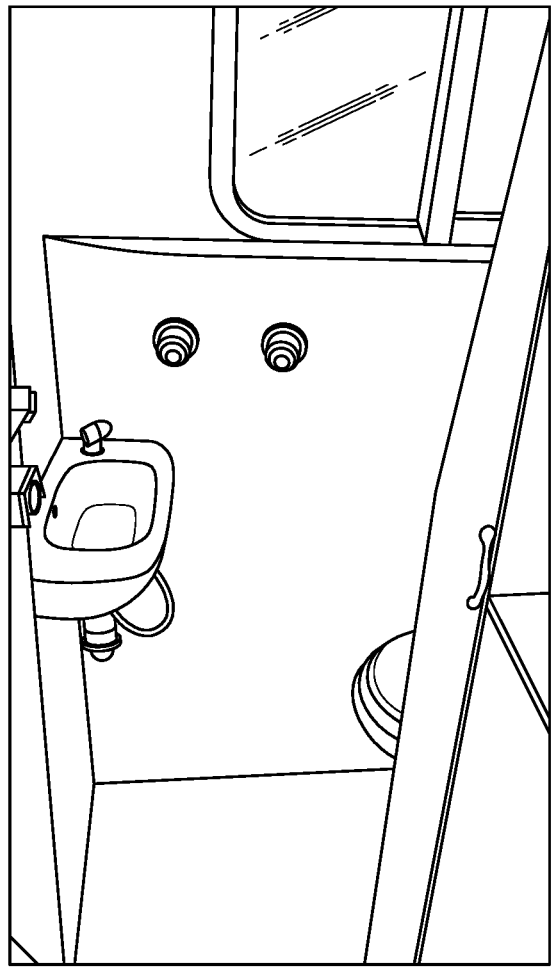
FIG. 15 is an alternate perspective view of the interior of the van showing the bathroom when the multi-purpose compartment is in the open position.

The present invention has many advantages including better access to useable space and increased energy efficiency. The design allows for the bed space to be available at the same time as the rest of the living space as opposed to other designs that have bed space that folds down into the useable living space. Sliding the compartment over the front of the vehicle is also more space efficient than sliding in any other direction because when it is fully extended, the slide does not exceed the footprint of the vehicle (FIG. 2, 3). This allows for the vehicle to fit inside a single parking space with the slide fully extended. Since the slide does not take up the full length of the vehicle in the closed position, there is room at the rear of the vehicle for a full stand up bathroom with a toilet, sink, and shower (FIG. 13, 15). This design consists of a rigid second compartment shell 54 sliding through an opening in a rigid first compartment shell 20. The fact that both shells are rigid allows for better insulation and more energy efficiency with heating and cooling than designs that rely on moving components that are made of canvas or other non-rigid material.

The compartment space can also be created in a van that is designed and manufactured with stand-up ceiling height in its interior. This can be done by cutting an opening in the front panel above the windshield and mounting the slide tracks (40/42), automatic opener (44), and sliding second compartment (52) to the van's interior so that the second compartment slides out of the opening in the front of the van while maintaining the original roof produced by the manufacturer of the vehicle. This eliminates the need to cut an opening in the roof of a van with a lower interior ceiling height and also the need to fabricate a first compartment shell (20) to mount to the top of the vehicle.

All of the parts of the multi-purpose compartment (16) are widely available and/or can be easily fabricated. Automatic opener 44 and object detection sensors 48 are from a standard chain-driven garage door opener available from LiftMaster. The frame (26) is made of wood and held together by screws. The front guide rail (36) is made of angle steel stock. Other metals that have the appropriate strength characteristics could also be used. The tracks (40/42) are made of C-channel steel stock. Other metals that have the appropriate strength characteristics could also be used. The mounting brackets (38) are made of angle steel and aluminum stock. The platform (56) is made from a sheet of plywood. The left platform guide rail (58) and right platform guide rail (60) are made of angle steel stock. Other metals that have the appropriate strength characteristics could also be used. The wheels (62) are threaded track rollers and are widely available online from suppliers such as McMaster-Carr. The opener attachment (50) is made of flat steel stock and a modified screw that is welded to the flat stock. A nut is threaded partially over the top of the screw that attaches to the automatic opener (44). All of these components are widely available at Home Depot or other similar retailers. Both the first compartment shell (20) and second compartment shell (54) are made from fiberglass mat, sheet, and body filler. These materials are available at automotive parts suppliers such as NAPA. The closed cell foam insulation (24/68) is available from Lapolla Industries. Lapolla Industries can advise on an authorized local installer.

The applications of the recreational van and multi-purpose compartment are not limited to those associated with those of a recreational vehicle. The multi-purpose compartment (16) can also be used to serve commercial purposes in work vehicles. The multi-purpose compartment (16) can provide additional storage space for tools and supplies and slide out over the front of the vehicle to provide space inside the van for a person to stand.

The foregoing description is intended primarily for purposes of illustration. This invention may be embodied in other forms or carried out in other ways without departing from the spirit or scope of the invention. Modifications and variations still falling within the spirit or scope of the invention will be readily apparent to those of skill in the art.

What is claimed:

1. A multi-purpose compartment for a recreational vehicle or a van, comprising:
    a recreational vehicle or a van body having a roof with an opening;
    a frame around a perimeter of the opening; and
    a multi-purpose compartment engaged with said roof about said opening and said frame, wherein said multi-purpose compartment includes a first compartment and a second compartment movably engageable within said first compartment, wherein said first compartment includes a rigid first shell affixed to and immovably engaged with said frame, wherein said second compartment includes a second shell and a platform movably engaged with said frame and within said rigid first shell, and wherein said second compartment is movable from a closed position where said second compartment is disposed above said roof to an opened position where said second compartment is extended horizontally forward from said rigid first shell.

2. The multi-purpose compartment of claim 1, further comprising a first track mounted to said frame for movably engaging said second compartment.

3. The multi-purpose compartment of claim 2, further comprising a first guide rail mounted to said platform and adapted to engage said first track.

4. The multi-purpose compartment of claim 3, further comprising a second track mounted to said frame for movably engaging said second compartment.

5. The multi-purpose compartment of claim 4, further comprising a second guide rail mounted to said platform and adapted to engage said second track.

6. A multi-purpose compartment for a recreational vehicle or a van, comprising:
   a recreational vehicle or a van body having a roof with an opening;
   a frame around a perimeter of the opening;
   a multi-purpose compartment engaged with said roof about said opening and said frame, wherein said multi-purpose compartment includes a first compartment and a second compartment movably engageable within said first compartment, wherein said first compartment includes a rigid first shell affixed to and immovably engaged with said frame, wherein said second compartment includes a second shell and a platform movably engaged with said frame and within said rigid first shell, and wherein said second compartment is movable from a closed position where said second compartment is disposed above said roof to an opened position where said second compartment is extended horizontally forward from said rigid first shell;
   a first track mounted to said frame for movably engaging said second compartment;
   a first guide rail mounted to said platform and adapted to engage said first track;
   a second track mounted to said frame for movably engaging said second compartment;
   a second guide rail mounted to said platform and adapted to engage said second track; and
   a mattress disposed within said second compartment.

7. A multi-purpose compartment for a recreational vehicle or a van, comprising:
   a recreational vehicle or a van body having a roof with an opening;
   a frame around a perimeter of the opening;
   a multi-purpose compartment engaged with said roof about said opening and said frame, wherein said multi-purpose compartment includes a first compartment and a second compartment movably engageable within said first compartment, wherein said first compartment includes a rigid first shell affixed to and immovably engaged with said frame, wherein said second compartment includes a second shell and a platform movably engaged with said frame and within said rigid first shell, and wherein said second compartment is movable from a closed position where said second compartment is disposed above said roof to an opened position where said second compartment is extended horizontally forward from said rigid first shell;
   a first track mounted to said frame for movably engaging said second compartment;
   a first guide rail mounted to said platform and adapted to engage said first track;
   a second track mounted to said frame for movably engaging said second compartment;
   a second guide rail mounted to said platform and adapted to engage said second track; and
   at least two wheels attached to the platform positioned to travel along the first and second tracks.

8. A multi-purpose compartment for use with a van body having a roof with an opening, the multi-purpose compartment comprising:
   a first compartment comprising a frame secured to the roof of the van and a rigid shell engaged within said frame; and
   a second compartment comprising a shell and a platform, wherein said second compartment is engaged with said first compartment between a closed position where said second compartment is disposed within said first compartment and above the roof, and an opened position where said second compartment is extended from said first compartment and horizontally forward of said first compartment.

9. The multi-purpose compartment of claim 8, further comprising a first track mounted to said frame for movably engaging said second compartment.

10. The multi-purpose compartment of claim 9, further comprising a first guide rail mounted to said platform and adapted to engage said first track.

11. The multi-purpose compartment of claim 10 further comprising a second track mounted to said frame for movably engaging said second compartment.

12. The multi-purpose compartment of claim 11, further comprising a second guide rail mounted to said platform and adapted to engage said second track.

13. A multi-purpose compartment for use with a van body having a roof with an opening, the multi-purpose compartment comprising:
   a first compartment comprising a frame secured to the roof of the van and a rigid shell engaged within said frame;
   a second compartment comprising a shell and a platform, wherein said second compartment is engaged with said first compartment between a closed position where said second compartment is disposed within said first compartment and above the roof, and an opened position where said second compartment is extended from said first compartment and horizontally forward of said first compartment;
   a first track mounted to said frame for movably engaging said second compartment;
   a first guide rail mounted to said platform and adapted to engage said first track;
   a second track mounted to said frame for movably engaging said second compartment;
   second guide rail mounted to said platform and adapted to engage said second track; and
   a mattress disposed within said second compartment.

14. A method of modifying a recreational vehicle or a van to include a multi-purpose compartment, comprising the steps of:
   cutting an opening in the roof of the recreational vehicle or a van;
   attaching a frame around the perimeter of the opening; and
   securing a multi-purpose compartment to the roof, wherein said multi-purpose compartment includes a first compartment and a second compartment movably engageable within said first compartment, wherein said first compartment includes a first rigid shell affixed to and immovably engaged with said frame, wherein said second compartment includes a second shell and a platform movably engaged to said frame, and wherein said second compartment is movable from a closed position where said second compartment is disposed above the roof and immovably affixed thereto, to an opened position where said second compartment is extended horizontally forward from said first compartment.

* * * * *